US012658207B1

(12) United States Patent
Ito et al.

(10) Patent No.: US 12,658,207 B1
(45) Date of Patent: Jun. 16, 2026

(54) VOLTAGE SLEW CONTROL OF FINE ACTUATORS IN HARD DISK DRIVE

(71) Applicant: Western Digital Technologies, Inc., San Jose, CA (US)

(72) Inventors: Hideaki Ito, Fujisawa (JP); Gaku Ikedo, Fujisawa (JP); Hajime Eguchi, Fujisawa (JP); Ryan Mayo, Aliso Viejo, CA (US); Akira Yokozuka, Fujisawa (JP)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 19/179,142

(22) Filed: Apr. 15, 2025

(51) Int. Cl.
*G11B 5/55* (2006.01)

(52) U.S. Cl.
CPC ................................... *G11B 5/556* (2013.01)

(58) Field of Classification Search
None
See application file for complete search history.

(56) References Cited

U.S. PATENT DOCUMENTS

| | | | |
|---|---|---|---|
| 5,969,895 A | 10/1999 | Ueda et al. | |
| 6,671,121 B1 * | 12/2003 | Bradbury | G11B 21/12 |
| 7,679,854 B1 | 3/2010 | Narayana et al. | |
| 7,974,039 B1 | 7/2011 | Xu et al. | |

| | | | |
|---|---|---|---|
| 9,007,714 B1 * | 4/2015 | Zheng | G11B 5/5552 |
| | | | 360/75 |
| 12,406,697 B1 * | 9/2025 | Ikedo | G11B 19/28 |
| 2006/0039079 A1 * | 2/2006 | Kobayashi | G11B 5/556 |
| 2008/0002267 A1 * | 1/2008 | Jang | B82Y 10/00 |
| 2023/0186947 A1 * | 6/2023 | Byoun | G11B 5/556 |
| | | | 360/78.05 |
| 2024/0412760 A1 * | 12/2024 | Oozeki | G11B 5/5547 |

FOREIGN PATENT DOCUMENTS

| | | |
|---|---|---|
| JP | 2011060407 A | 3/2011 |
| WO | 2023113856 A1 | 6/2023 |

OTHER PUBLICATIONS

Rahman et al., "Discrete-time Model Predictive Control for Head-Positioning Servomechanism in a Dual-stage Hard Disk Drive", Proceedings of 2014 IEEE International Conference on Mechatronics and AutomationAug. 3-6, Tianjin, China, 6 pages, retrieved from https://ieeexplore.ieee.org/abstract/document/6885663.

(Continued)

*Primary Examiner* — Peter Vincent Agustin
(74) *Attorney, Agent, or Firm* — NOD Law PC

(57) ABSTRACT

A data storage device comprises a recording head, a disk, a first fine actuator group configured to position the recording head over the disk, and control circuitry. The control circuitry is configured to apply a slew control voltage waveform to the first fine actuator group to transition the first fine actuator group from an active state to an inactive state, and apply a control signal initiating at a last-applied value of the slew control voltage waveform to the first fine actuator group to transition the first fine actuator group back to the active state before completion of the slew control voltage waveform.

20 Claims, 9 Drawing Sheets

(56) References Cited

OTHER PUBLICATIONS

Sun et al., "Vibration suppression of a hard disk driver actuator arm using piezoelectric shunt damping with a topology-optimized PZT transducer", 2009, Smart Materials and Structures, vol. 18, 13 pages, retrieved from https://www.researchgate.net/publication/231115364_Vibration_suppression_of_a_hard_disk_driver_actuator_arm_using_piezoelectric_shunt_damping_with_a_topology-optimized_PZT_transducer.

Suzuki et al., "A MEMS based active head slider for flying height control in magnetic recording", 2004, JSME International Journal, Series B, vol. 47, No. 3, pp. 453-457, retrieved from https://www.jstage.jst.go.jp/article/jsmeb/47/3/47_3_453/_pdf.

* cited by examiner

600

APPLY CONTROL SIGNAL TO
FIRST FINE ACTUATOR
GROUP FOR FIRST
DURATION          602

APPLY CONTROL SIGNAL TO
SECOND FINE ACTUATOR
GROUP FOR SECOND
DURATION          604

APPLY SLEW CONTROL
VOLTAGE WAVEFORM TO
DISCHARGE FIRST FINE
ACTUATOR GROUP          606

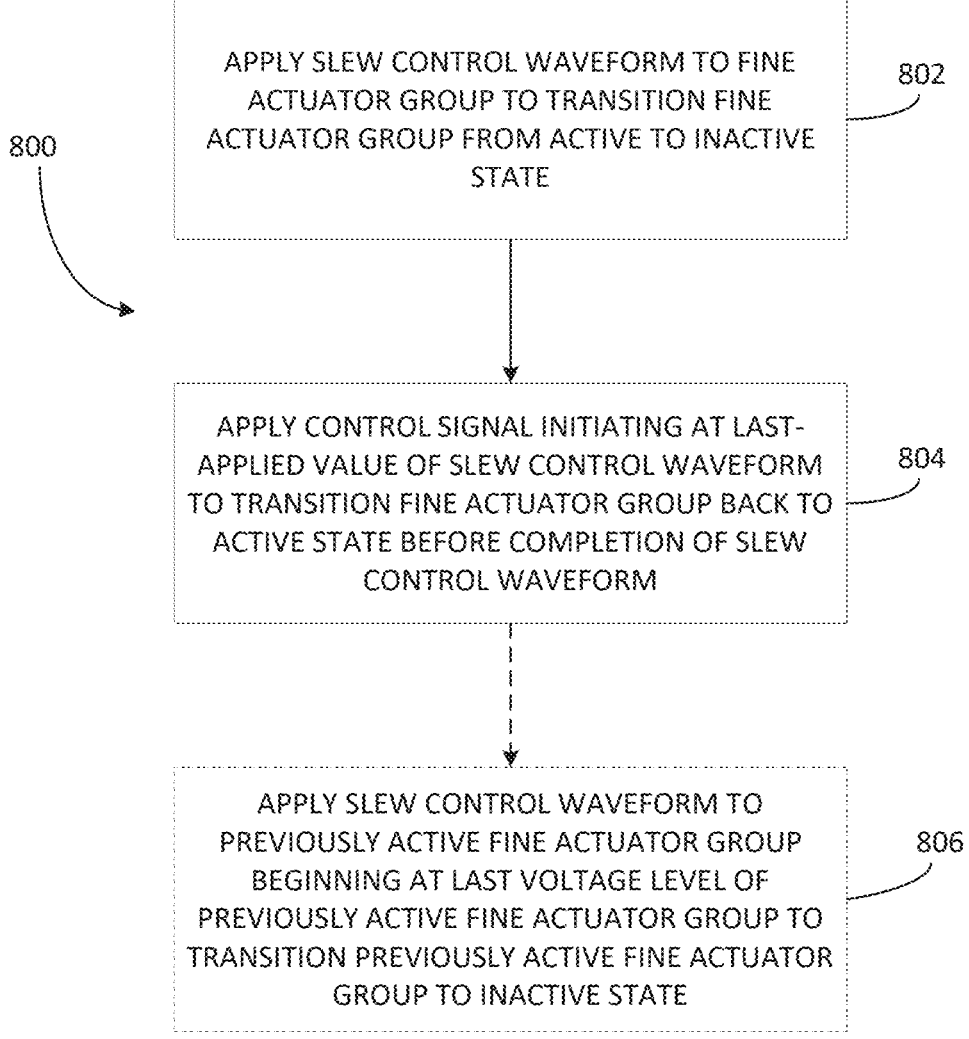

800

APPLY SLEW CONTROL WAVEFORM TO FINE ACTUATOR GROUP TO TRANSITION FINE ACTUATOR GROUP FROM ACTIVE TO INACTIVE STATE

802

APPLY CONTROL SIGNAL INITIATING AT LAST-APPLIED VALUE OF SLEW CONTROL WAVEFORM TO TRANSITION FINE ACTUATOR GROUP BACK TO ACTIVE STATE BEFORE COMPLETION OF SLEW CONTROL WAVEFORM

804

APPLY SLEW CONTROL WAVEFORM TO PREVIOUSLY ACTIVE FINE ACTUATOR GROUP BEGINNING AT LAST VOLTAGE LEVEL OF PREVIOUSLY ACTIVE FINE ACTUATOR GROUP TO TRANSITION PREVIOUSLY ACTIVE FINE ACTUATOR GROUP TO INACTIVE STATE

VOLTAGE SLEW CONTROL OF FINE ACTUATORS IN HARD DISK DRIVE

BACKGROUND

Data storage devices, such as disk drives, typically include one or more magnetic storage media (e.g., disks), which are spun by a spindle motor, and at least one recording (read/write) head for each disk surface. Each recording head is located at a distal end of an actuator arm that is pivotably mounted to move the recording head radially over the disk. Radial movement of the recording head over the disk surface is effected by an actuator such as a voice coil motor (VCM) that rotates the actuator arm about a pivot. A fine actuator—such as a piezoelectric micro- or milli-actuator—may be used in addition to the VCM to deliver more precise positioning of the recording head relative to the disk surface.

Each disk is formatted with multiple concentric, radially-spaced tracks that contain user data sectors and servo sectors. The servo sectors store head-positioning information such as track addresses that are read by the recording head and used by a servo control system to guide the actuator arms over the disk tracks. When multiple disks are present, each disk typically has a top and bottom surface accessed by its own recording head. The servo control system uses the servo data from each disk surface to accurately position each recording head and facilitate reliable read and write operations across the device.

FIG. 1 conceptually illustrates a conventional disk format 2 that includes multiple tracks 4 segmented by servo sectors $6_0 \ldots 6_N$. Each servo sector $6_i$ contains a preamble 8 storing a periodic pattern that enables gain calibration and timing synchronization of the read signal, a synchronization (sync) mark 10 that indicates the start of the following servo data field 12, and servo data field 12 that contains coarse position information such as a servo track address to guide the recording head to the correct track 4 during a seek operation. Each servo sector $6_i$ also includes groups of servo bursts 14 (e.g., N and Q bursts) that are recorded with specific phase relationships to each other and to the servo track centerlines. Phase-based servo bursts 14 provide fine head-positioning information that helps keep the recording head centered on a track during read/write operations. Reading bursts 14 generates a position error signal (PES) indicating how far the head is offset from the track centerline. A servo controller processes the PES to produce a control signal that moves the actuator arm radially over the disk in a manner that reduces this offset.

The inclusion of any information in this background section should not be construed as an admission that such information constitutes prior art. This background section may describe aspects of the subject invention and related concepts.

SUMMARY

The following summary relates to one or more aspects or embodiments disclosed herein. It is not intended to provide a comprehensive overview of all contemplated aspects or embodiments, nor should it be construed as identifying key or essential features limiting the scope of any particular aspect or embodiment. Rather, this summary presents certain concepts in a simplified form as a prelude to the detailed description that follows.

Some aspects of this disclosure are directed to a data storage device comprising a recording head; a disk; a first fine actuator group configured to position the recording head over the disk; and control circuitry configured to apply a slew control voltage waveform to the first fine actuator group to transition the first fine actuator group from an active state to an inactive state, and apply a control signal initiating at a last-applied value of the slew control voltage waveform to the first fine actuator group to transition the first fine actuator group back to the active state before completion of the slew control voltage waveform.

Additional aspects of this disclosure are directed to a method for controlling a data storage device. The method comprises applying a slew control voltage waveform to a first fine actuator group to transition the first fine actuator group from an active state to an inactive state, and applying a control signal initiating at a last-applied value of the slew control voltage waveform to the first fine actuator group to transition the fine actuator group back to the active state before completion of the slew control voltage waveform.

Further aspects of this disclosure are directed to control circuitry for controlling a data storage device. The control circuitry is configured to apply a slew control voltage waveform to a first fine actuator group to transition the first fine actuator group from an active state to an inactive state, and apply a control signal initiating at a last-applied value of the slew control voltage waveform to the first fine actuator group to transition the fine actuator group back to the active state before completion of the slew control voltage waveform.

Additional aspects of this disclosure are described in greater detail below and are illustrated in the accompanying drawing figures.

BRIEF DESCRIPTION OF THE DRAWINGS

The following description and accompanying drawings illustrate various features and advantages of this disclosure. The drawings are not necessarily to scale, as emphasis is placed on illustrating the principles of the disclosure. Like reference characters may be used to indicate the same components across different figures and views. The drawings provide illustrative examples and should not be construed as limiting the scope of this disclosure.

FIG. 8 illustrates a method for mitigating voltage discontinuities when a fine actuator group transitions to an active state, in accordance with aspects of this disclosure.

DETAILED DESCRIPTION

The embodiments described herein are not intended to limit the invention to the precise forms disclosed, nor are they exhaustive. Rather, various embodiments are provided to facilitate understanding by those skilled in the art. The terms 'exemplary' and 'example,' as used herein, refer to instances or illustrations and should not be construed as limiting or as indicating a preferred or advantageous embodiment relative to other embodiments.

Hard disk drives (HDDs) comprise an actuator—typically a rotary voice coil motor (VCM)—for positioning recording heads over disk tracks. A servo control system receives a position error signal (PES) derived from servo positioning information read by the heads and generates a VCM control signal to maintain the heads on track or move them to a desired track for data reading or writing operations. Each recording head is connected to the distal end of an actuator arm that rotates about a pivot under control of the VCM, thereby actuating the head radially over the disk to access radially-spaced, concentric tracks. The disk drive generally receives power from a host computer to operate the VCM, a spindle motor, one or more control circuits that control disk drive functions, and other disk drive components. Disks are spun at high speed by the spindle motor to form a gas bearing between the recording head and its corresponding disk surface, and the VCM moves the recording head across the disk to a target track.

To read or write data, recording heads must be positioned with high accuracy over the target track. In high-density storage media, dual-stage actuator (DSA) systems have been developed to finely tune the head position and boost access speed. DSA systems typically comprise a primary coarse actuator (such as a VCM that makes larger adjustments to the recording head position) and a secondary fine actuator (such as a piezoelectric (PZT) milli-actuator that makes smaller and more precise adjustments to the recording head position). Working in tandem, the coarse and fine actuators of the DSA system enable efficient and accurate track access.

Figure 2A:
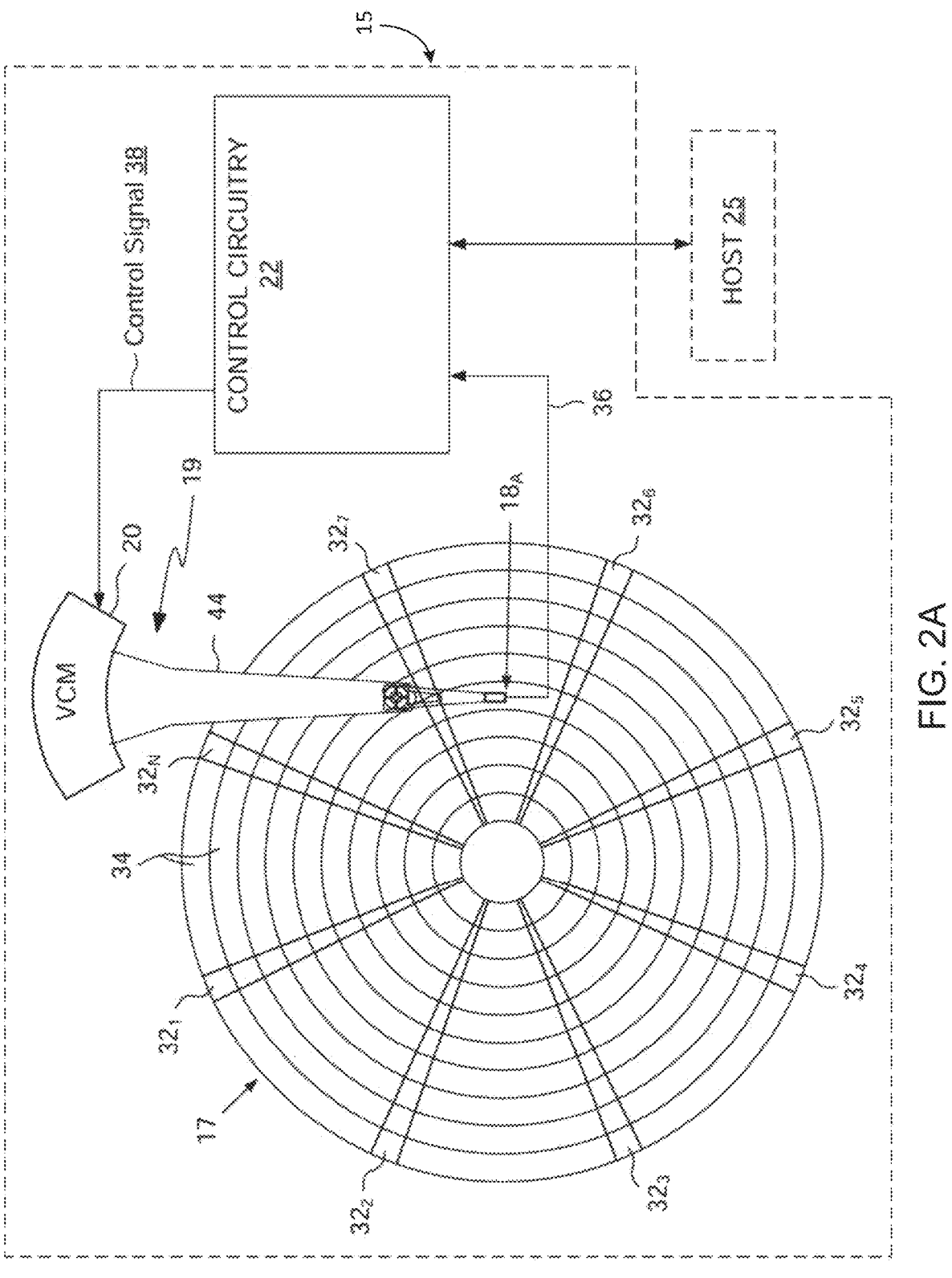
FIG. 2A is a conceptual top view of a data storage device in the form of a disk drive, in accordance with aspects of this disclosure.
Figure 2B:
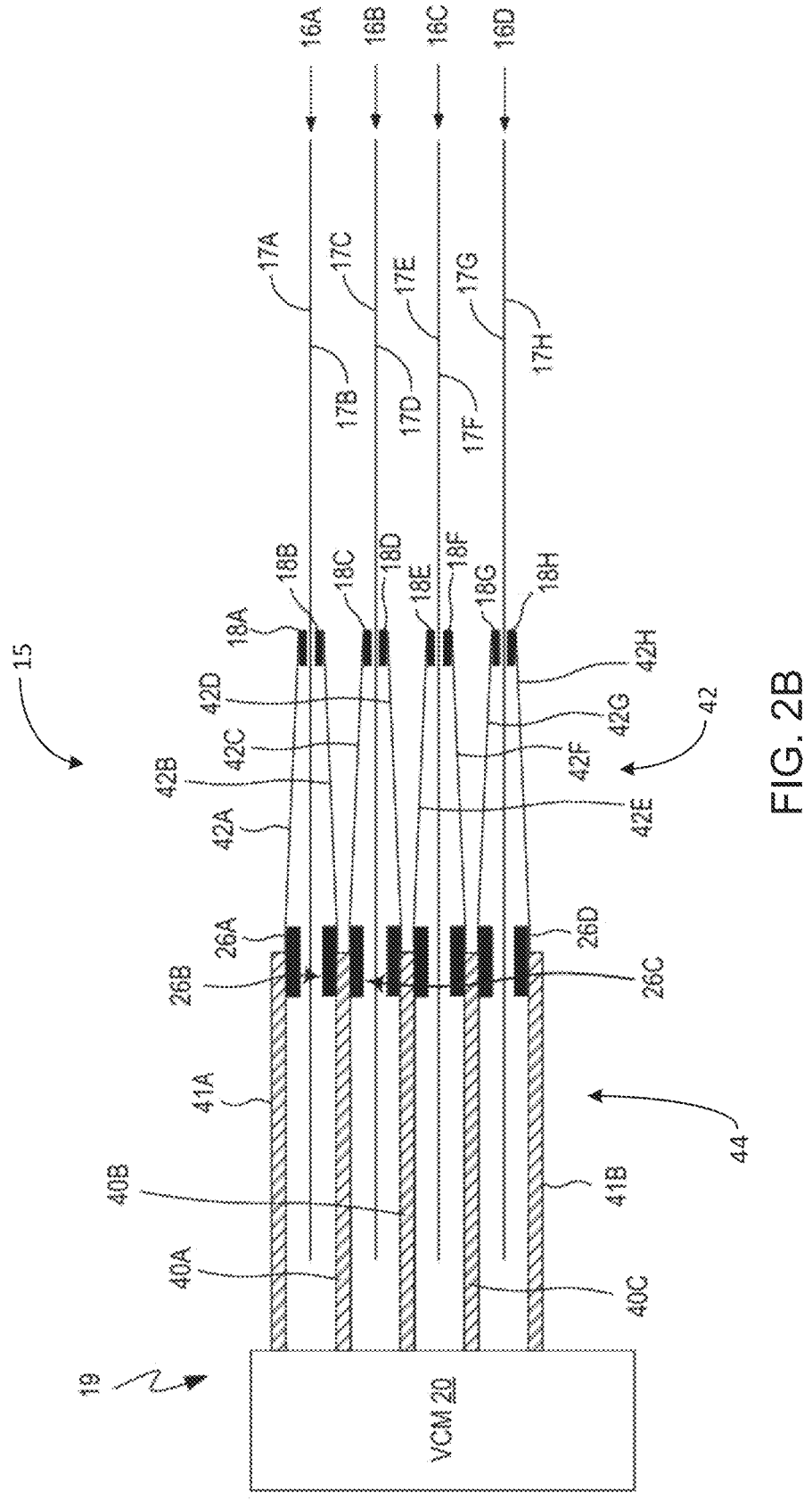
FIG. 2B is a conceptual side view of the data storage device of FIG. 2A, in accordance with aspects of this disclosure.

FIGS. 2A and 2B illustrate an exemplary data storage device in the form of disk drive 15, in accordance with aspects of this disclosure. Disk drive 15 of FIGS. 2A-2B is merely one example of a data storage device configured to implement the principles of this disclosure. Various other implementations are possible and may use disks, disk surfaces, actuator arms, fine actuators, suspension assemblies, recording heads, and other constituent components that differ in configuration and number from that shown in the specific example of FIGS. 2A-2B.

Figure 1:
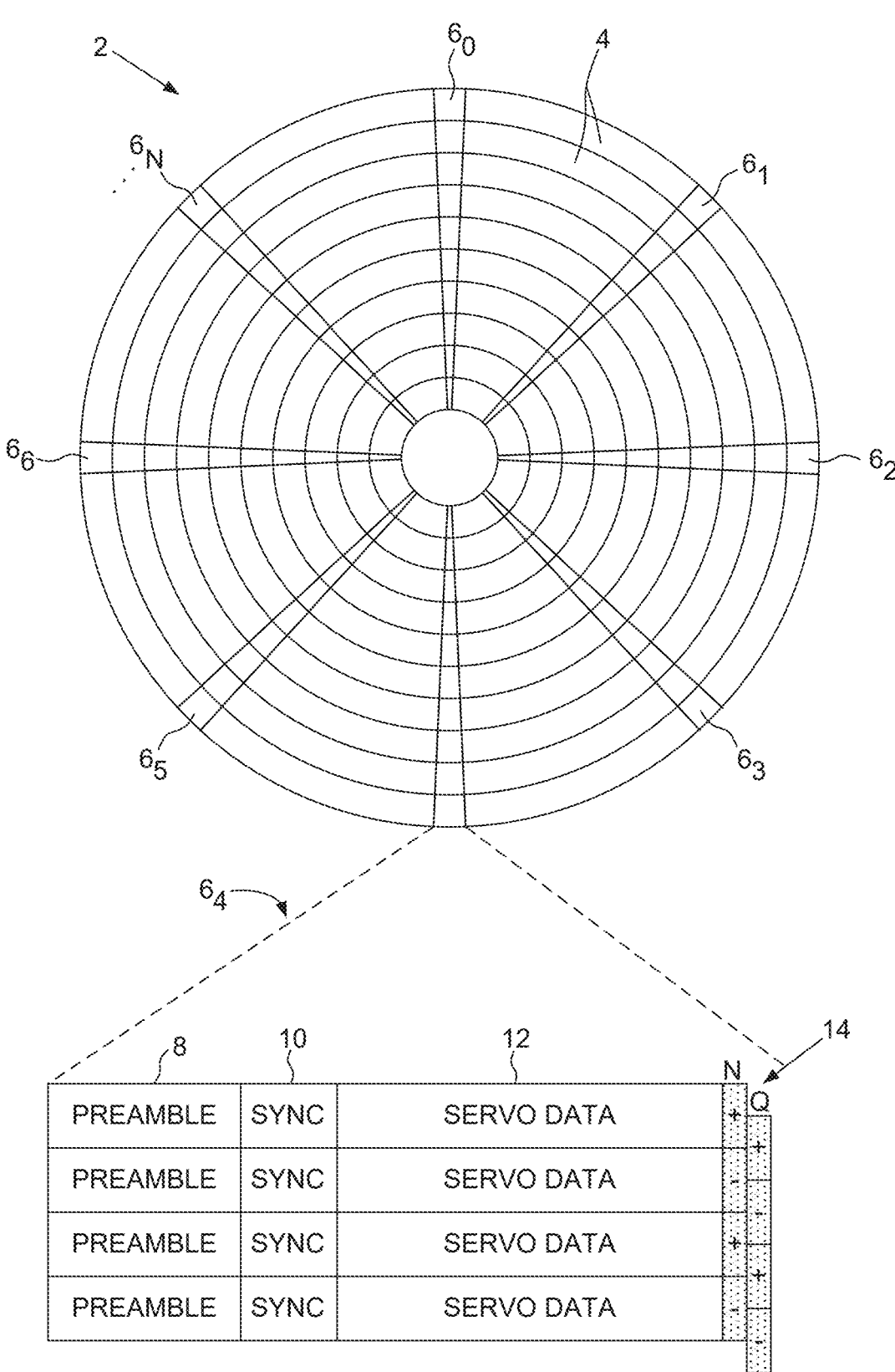
FIG. 1 is a conceptual diagram of a conventional disk format, in accordance with aspects of this disclosure.

Disk drive 15, which may implement aspects of disk format 2 of FIG. 1, comprises control circuitry 22, actuator assembly 19, and a plurality of disks 16 (e.g., disks 16A, 16B, 16C, 16D) in a stacked-disk configuration, with each disk 16 having a top and a bottom disk surface. Top disk 16A, for example, has a top disk surface 17A and a bottom disk surface 17B. Actuator assembly 19 is a dual-stage actuator (DSA) system comprising coarse and fine actuators. In particular, actuator assembly 19 comprises VCM 20 as the primary coarse actuator and a plurality of secondary fine actuators 26 (e.g., fine actuators 26A, 26B, 26C, 26D).

In some examples, secondary fine actuators 26 are implemented as micro-actuators and/or milli-actuators incorporating piezoelectric (PZT) elements to achieve fine positioning control of recording heads 18. Fine actuators 26 function within the DSA system alongside VCM 20 to enable high-precision head positioning. Micro-actuators, typically mounted on the suspension assembly, provide rapid, localized adjustments to compensate for track misalignment caused by mechanical vibrations, thermal drift, or external shocks. Milli-actuators, typically integrated into the actuator arm or suspension base, offer additional fine-tuning by controlling tilt or lateral movement. Both micro- and milli-actuators employ PZT elements, which deform under applied voltage to produce controlled mechanical displacement, allowing for rapid track-following corrections and head adjustments.

Actuator assembly 19 comprises a plurality of actuator arms 44, including inner actuator arms 40 and outer actuator arms 41, which extend into the spaces between the stacked disks 16. Each actuator arm 44 supports one or more recording heads 18 that access adjacent disk surfaces 17. Inner actuator arms 40 are positioned within the vertically inner portion of the disk stack and, in some examples, each arm 40 carries two fine actuators-one configured to actuate a top recording head over a top surface of one disk and another configured to actuate a bottom recording head over a bottom surface of an adjacent disk. Outer actuator arms 41 are positioned at the vertically uppermost and lowermost positions of the disk stack and, in some examples, each arm 41 carries a single fine actuator configured to actuate a single recording head over either the topmost or bottommost surface of the disk stack. In this description, inner actuator arms 40 may be referred to as a first fine actuator group, and outer actuator arms 41 may be referred to as a second fine actuator group.

In the non-limiting example of FIG. 2B, actuator assembly 19 comprises three inner actuator arms 40A, 40B, 40C and two outer actuator arms 41A, 41B. Each inner actuator arm 40A, 40B, 40C supports two fine actuators: one fine actuator configured to actuate a top recording head over a top disk surface and another fine actuator configured to actuate a bottom recording head over a bottom disk surface. For example, inner actuator arm 40A supports inner fine actuator 26C configured to actuate top recording head 18C over top disk surface 17C, and inner fine actuator 26B configured to actuate bottom recording head 18B over bottom disk surface 17B. Each outer actuator arm 41A, 41B, by contrast, carries a single fine actuator. Outer actuator arm 41A supports outer fine actuator 26A configured to actuate topmost head 18A over topmost disk surface 17A, and outer actuator arm 41B supports outer fine actuator 26D configured to actuate bottommost head 18H over bottommost disk surface 17H.

The coarse actuator (VCM 20) is configured to concurrently move inner actuator arms 40 and outer actuator arms 41 such that recording heads 18 are actuated over disk surfaces 17. Fine actuators 26 provide additional and more precise positioning adjustments of recording heads 18. In some examples, the inner fine actuators configured on inner actuator arms 40 (e.g., inner fine actuators 26B, 26C) are controlled independently from the outer fine actuators configured on outer actuator arms 41 (e.g., outer fine actuators 26A, 26D). Actuator assembly 19 is thus configured to position one or more recording heads 18 over disk surfaces 17 of one or more disks 16. Each recording head 18A-18H comprises read and write elements that read and write data and control features to and from disk surfaces 17A-17H of disks 16A-16D.

In the example of FIG. 2B, actuator arms 44 have suspension assemblies 42A-42H at their distal ends, and recording heads 18A-18H are located at the distal ends of suspension assemblies 42A-42H. Fine actuators 26 are integrated into suspension assemblies 42 and function by applying precise mechanical displacements to the suspension structure, which in turn alters the position of the recording head relative to the disk surface such that rapid and localized head positioning adjustments can be provided without requiring full actuator arm movement. Fine actuators 26 are thereby able to perform adjustments, counteract external disturbances, and correct tracking errors with high precision.

FIG. 2A also illustrates a disk surface 17 (topmost disk surface 17A) and the radially-concentric tracks 34 and embedded servo sectors $32_1$-$32_N$ that are recorded thereon. Servo sectors $32_1$-$32_N$ are spaced sequentially around circumferential tracks 34 and extend radially outwardly from the inner diameter (ID) of disk surface 17. Servo sectors $32_1$-$32_N$ comprise various control features used in seeking and track following, including a phase lock loop (PLL) field, a servo sync mark (SSM) field, a track identification (TKID) field, a sector ID (SID), and servo bursts. Servo sectors 32 are interspersed between data regions containing data written in a plurality of discrete data sectors, with each data region typically being preceded by a servo sector 32. Control circuitry 22 processes signal 36 from head 18 to demodulate servo data that is read from servo sectors 32 and generates a position error signal (PES) that reflects how far head 18 is from its intended track position. Control circuitry 22 generates control signal 38 from the PES to control coarse actuator (VCM) 20 and fine actuators 26 to actuate recording heads 18 over disk surface 17 in a way that correctly positions recording heads 18 and reduces position error.

Control circuitry 22 may be implemented in one or more processing devices and is responsible for managing and controlling various operations of disk drive 15. Control circuitry 22 coordinates various subsystems within disk drive 15 including a servo control system that processes the PES signals from recording heads 18 and generates control signals 38 to drive VCM 20 for coarse positioning and fine actuators 26 for precision alignment of heads 18 over disk surfaces 17. Control circuitry 22 may be distributed across multiple integrated circuits (ICs) and digital signal processors. As described below, some functions of control circuitry 22 may be implemented in a system on a chip (SoC) that integrates electronic components and firmware to facilitate efficient drive operation. Further, certain power and control functions of control circuitry 22, such as fine actuator power distribution and control, may be implemented using a power large scale integration (PLSI) circuit.

Host 25, shown in FIG. 2A, refers to a computing device that interacts with and issues commands to disk drive 15 to store, retrieve, and manage data. Host 25 may be, for example, a desktop computer, laptop, server, smartphone, tablet, or other computing device. In some cases, host 25 may be a test computer used during disk drive manufacturing and calibration and may issue diagnostic commands to evaluate the performance of disk drive 15. Control circuitry 22 manages interaction of host 25 with disk drive 15, interpreting commands from host 25, managing data flow, and ensuring proper execution of read and write operations.

In the following description, a first group of fine actuators (first fine actuator group) and a second group of fine actuators (second fine actuator group) refer to two separate groups of fine actuators within actuator assembly 19 that are independently controlled by control circuitry 22. FIGS. 2A-2B illustrate one example of this configuration, in which the inner fine actuators (e.g., inner fine actuators 26B, 26C) form the first fine actuator group, and the outer fine actuators (e.g., outer fine actuators 26A, 26D) form the second fine actuator group. It should be understood, however, that other configurations of independently-controlled actuator groupings are possible and are within the scope of this disclosure.

Control circuitry 22 controls a first group of recording heads (e.g., the inner head group) via the first fine actuator group (e.g., the inner fine actuators) for a first duration and separately controls a second group of recording heads (e.g., an outer head group) via the second fine actuator group (e.g., the outer fine actuators) for a second duration. In some examples, to prevent electrical interference and mechanical stress on the suspension system, the first and second durations do not overlap. At the end of the first duration (when the first fine actuator group transitions from an active state to an inactive state) and at the end of the second duration (when the second fine actuator group transitions from an active to an inactive state), a sudden voltage drop or change may occur within the fine actuator group being inactivated. This sudden voltage drop or change, or steep slew rate profile, can potentially cause mechanical oscillations or vibrations in the PZT elements of the fine actuators. This abrupt change can cause resonant oscillations and suspension vibrations that make it harder to keep the recording heads aligned over the data tracks.

To mitigate these effects, in accordance with aspects of this disclosure, control circuitry 22 implements a fine actuator slew rate control mechanism to gradually reduce the voltage applied to a fine actuator group when it is being deactivated, rather than cutting it off instantaneously. The fine actuator slew rate control mechanism applies a smooth voltage ramp-down, similar to how a dimmer switch gradually lowers the brightness of a light rather than shutting it off abruptly. By controlling the rate of voltage ramp-down, mechanical vibrations are reduced and stability is improved. In one non-limiting example, the slew rate control mechanism is implemented by generating and applying a slew control voltage waveform to gradually transition active fine actuators from an active state to an inactive state. Instead of an abrupt voltage cutoff, the slew control voltage waveform gradually ramps down the voltage, reducing oscillations and vibrations during the transition.

Figure 3:
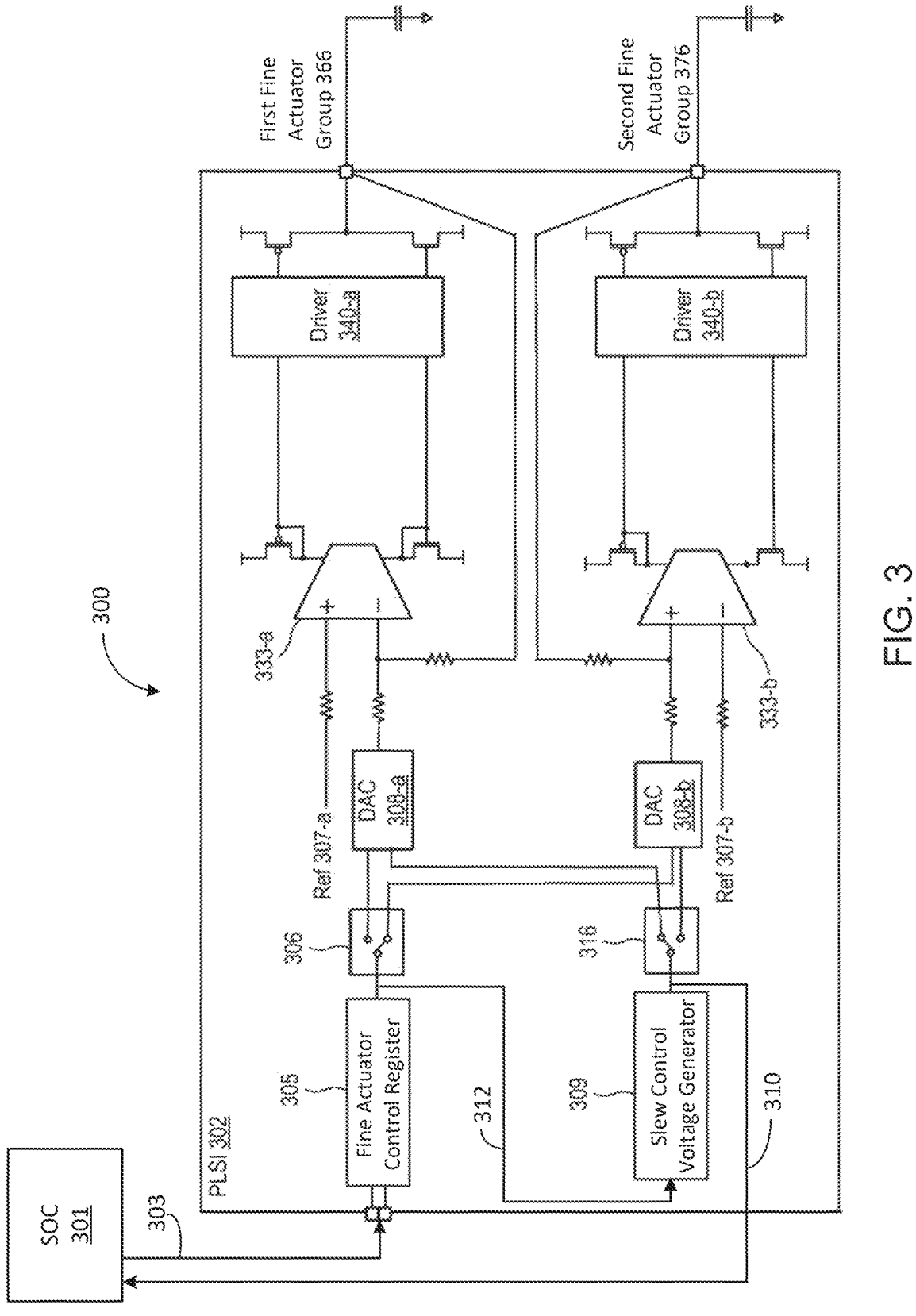
FIG. 3 is a schematic diagram of an actuator control architecture for providing fine actuator slew rate control, in accordance with aspects of this disclosure.

FIG. 3 is a schematic diagram of an actuator control architecture 300 implemented by control circuitry 22 for providing fine actuator slew rate control, in accordance with aspects of this disclosure. Actuator control architecture 300 coordinates drive signals and voltage switching for multiple fine actuator groups. In the example of FIG. 3, actuator control architecture 300 is implemented within control circuitry 22 by power large scale integration (PLSI) circuit 302, which receives control signals 303 from system on a chip (SOC) 301. In some examples, control signals 303 are digital commands generated by firmware implemented in SOC 301 for controlling fine actuators 26 to perform fine positioning adjustments on recording heads 18 based on servo feedback data (PES) and other drive parameters. Control signal 303 is routed by PLSI 302 either to control first fine actuator group (inner fine actuators) 366 (via first digital-to-analog converter (DAC) 308-a, first differential amplifier 333-a, and first fine actuator driver 340-a) or to control second fine actuator group (outer fine actuators) 376 (via second DAC 308-*b*, second differential amplifier 333-*b*, and second fine actuator driver 340-*b*).

Control signal 303 from SoC 301 is received by fine actuator control register 305 of PLSI 302. In some examples, fine actuator control register 305 is implemented as a milli dual stage actuator (mDSA) digital-to-analog (DAC) register that acts as a buffer, storing digital control values before forwarding them to a DAC for conversion into analog control signals that drive the fine actuators. To optimize head positioning accuracy while minimizing electrical and mechanical interference, SoC 301 alternates control between the two groups of fine actuators 366, 376, enabling or activating one group while disabling or deactivating the other. Based on the position of switch 306, the digital control values stored in register 305 are routed to either first DAC 308-*a* or second DAC 308-*b*, where they are converted into corresponding analog voltages, amplified by the associated differential amplifier (333-*a* or 333-*b*), and applied by the associated fine actuator driver (340-*a* or 340-*b*) to drive the currently active fine actuator group.

Simultaneously, based on the position of switch 316, slew control voltage generator 309 generates and sends a controlled slew rate voltage waveform to the other of DACs 308-*a* and 308-*b* to facilitate a smooth transition as the previously-active fine actuator group is transitioned to an inactive state. Instead of an abrupt voltage cutoff that could induce mechanical oscillations in the PZT elements of the fine actuators, the slew control voltage waveform gradually ramps down the voltage. In some examples, slew control voltage generator 309 may be realized as a digital signal processor (DSP) that computes and outputs a slew control voltage waveform based on predefined mathematical models, such as quadratic or higher-order polynomial functions. In some implementations, as will be described with reference to FIG. 5, slew control voltage generator 309 employs a piecewise quadratic function to generate a slew control voltage waveform having an S-shaped profile. By alternating between direct control from SoC 301 and slew-controlled deactivation, actuator control architecture 300 ensures continuous fine positioning adjustments while preventing sudden voltage discontinuities that could degrade disk drive performance.

For example, when switch 306 connects fine actuator control register 305 to second DAC module 308-*b*, as shown in FIG. 3, second fine actuator group 376 (the outer fine actuator group) is actively driven by second differential amplifier 333-*b* and second fine actuator driver 340-*b* to position the second (outer) recording head group in accordance with control signal 303. Simultaneously, switch 316 connects slew control voltage generator 309 to first DAC module 308-*a*, applying a controlled slew rate voltage waveform to first fine actuator group 366 (the inner fine actuator group) via first differential amplifier 333-*a* and first fine actuator driver 340-*a*, ensuring a smooth voltage ramp-down as the inner fine actuators transition to a disabled state. Conversely, when switch 306 connects fine actuator control register 305 to first DAC module 308-*a*, first fine actuator group 366 is actively driven to adjust the position of the first recording head group based on control signal 303, while switch 316 redirects slew control voltage generator 309 to second DAC module 308-*b*, enabling a controlled voltage ramp-down for second fine actuator group 376. This alternating scheme ensures that only one fine actuator group is actively controlled by SoC 301 at any given time, while the other undergoes a gradual voltage transition.

Differential amplifiers 333-*a*, 333-*b* receive analog signals from DAC modules 308-*a*, 308-*b* and amplify them to levels suitable for fine actuator control. Amplifiers 333-*a*, 333-*b* also receive reference signals 307-*a*, 307-*b* and incorporate feedback from fine actuator groups 366, 376, enabling real-time adjustments to compensate for variations such as temperature effects and mechanical drift. Fine actuator drivers 340-*a*, 340-*b* take the amplified signals and supply them to fine actuator groups 366, 376 with current and voltage characteristics necessary for nanometer-scale positioning accuracy. Actuator control architecture 300 thereby enables first fine actuator group 366 and second fine actuator group 376 to be independently driven by either SoC 301 or by slew control voltage generator 309. This configuration minimizes PZT oscillations and vibrations by preventing abrupt voltage drops (steep slew rate profiles) that typically occur when an actuator group transitions from an active to an inactive state. Additionally, the ability to alternate between direct SoC control and slew-based control allows for fine tuning of response characteristics and optimization of the fine actuator transfer function.

Figure 4:
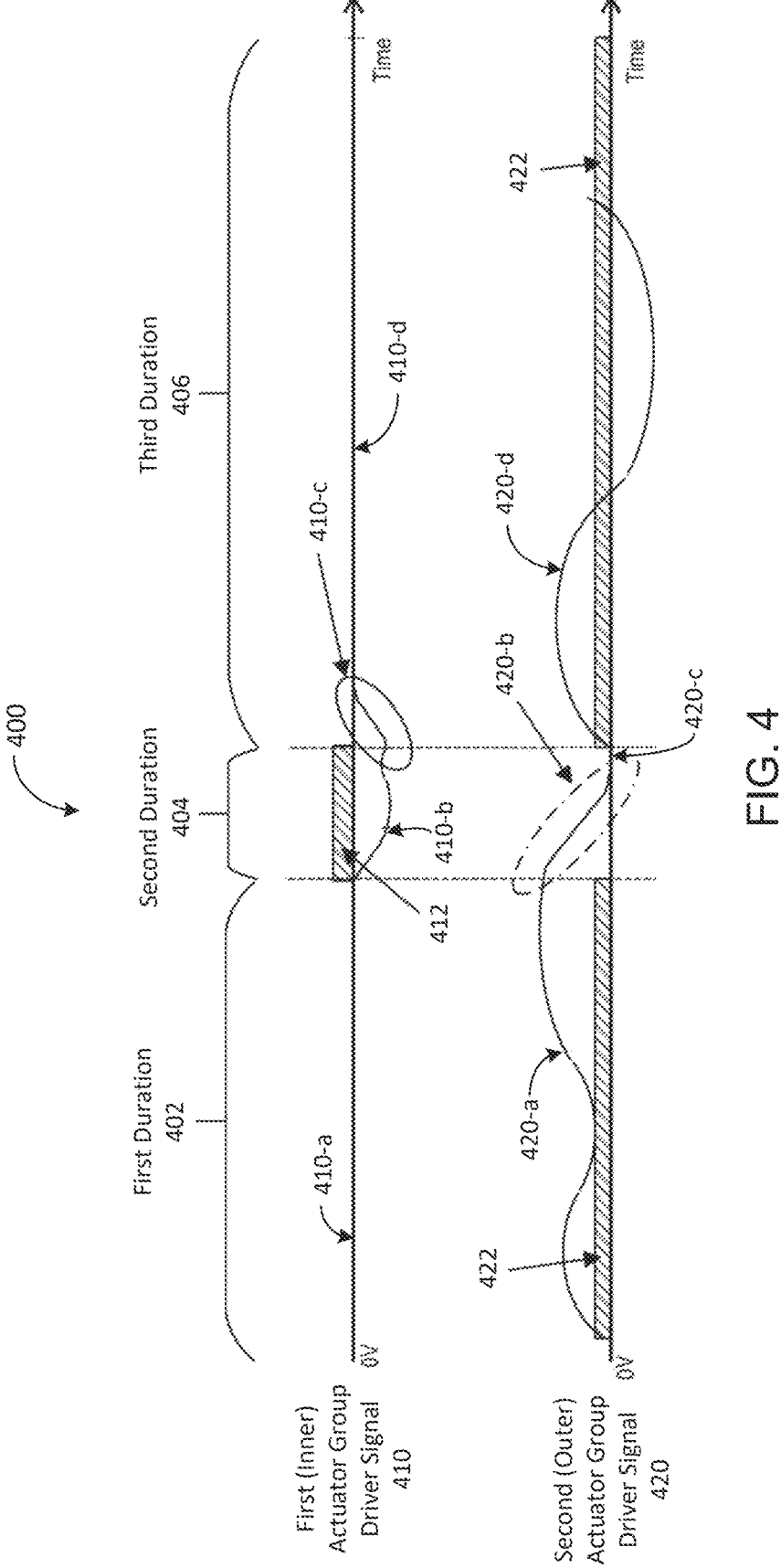
FIG. 4 is a timing diagram illustrating a first actuator group driver signal for driving a first fine actuator group and a second actuator group driver signal for driving a second fine actuator group, in accordance with aspects of this disclosure.

FIG. 4 is a timing diagram 400 illustrating first actuator group driver signal 410 (generated by first fine actuator driver 340-*a* to drive first fine actuator group 366) and second actuator group driver signal 420 (generated by second fine actuator driver 340-*b* to drive second fine actuator group 376), in accordance with aspects of this disclosure. Timing diagram 400 spans a time period comprising first duration 402, second duration 404, and third duration 406, and shows the controlled and sequential activation and deactivation of the fine actuator groups.

During first duration 402, SoC 301 controls switches 306 and 316 to couple fine actuator control register 305 to second DAC 308-*b* via switch 306 and to couple slew control voltage generator 309 to first DAC 308-*a* via switch 316. In this configuration, second fine actuator group 376 is driven by second differential amplifier 333-*b* and second fine actuator driver 340-*b* to position the second recording head group in accordance with control signal 303. Thus, during first duration 402, second actuator group driver signal 420 is transitioned to an active state at voltage level 420-*a*, as indicated by "active state" bar 422. Meanwhile, first fine actuator group 366 remains inactive, as reflected by zero-level portion 410-*a* of first actuator group driver signal 410.

At the transition from first duration 402 to second duration 404, SoC 301 controls switch 306 to couple fine actuator control register 305 to first DAC 308-*a* and control switch 316 to couple slew control voltage generator 309 to second DAC 308-*b*. In this configuration, first fine actuator group 366 is driven by first differential amplifier 333-*a* and first fine actuator driver 340-*a*, positioning the first recording head group in accordance with control signal 303 from SoC 301. Thus, at the transition from first duration 402 to second duration 404, first actuator group driver signal 410 is transitioned to an active state at voltage level 410-*b*, as indicated by active state bar 412.

Simultaneously, at the transition from first duration 402 to second duration 404, second fine actuator group 376 is transitioned to an inactive state by coupling second fine actuator driver 340-*b* to slew control voltage generator 309. Slew control voltage generator 309 generates and applies slew control voltage waveform 420-*b* to second fine actuator driver 340-*b* to gradually and smoothly reduce the signal to zero at 420-*c*. In some examples, as further described with reference to FIG. 5, slew control voltage waveform 420-*b* follows an S-shaped piecewise quadratic profile generated by slew control voltage generator 309.

At the transition from second duration 404 to third duration 406, SoC 301 controls switches 306, 316 to transition second fine actuator group 376 back to an active state at voltage level 420-*d*, as indicated by active state bar 422. Simultaneously, first actuator group 366 is transitioned to an inactive state by coupling first fine actuator driver 340-*a* to slew control voltage generator 309. Slew control voltage generator 309 generates and applies slew control voltage waveform 410-*c* to first fine actuator driver 340-*a* to gradually and smoothly reduce the signal to zero at 410-*d*.

This alternating scheme—where one fine actuator group is driven at a controlled (active) level by the SoC and the other fine actuator group is gradually ramped to zero by application of a slew control voltage waveform—reduces mechanical oscillations in disk drive 15 by avoiding sudden voltage changes. As shown in FIG. 4, the transition of each fine actuator group to an inactive state is carried out by a slew control voltage waveform that smoothly and gradually shifts the fine actuator driver signal level to zero when that group of fine actuators is switched to an inactive state.

Figure 5:
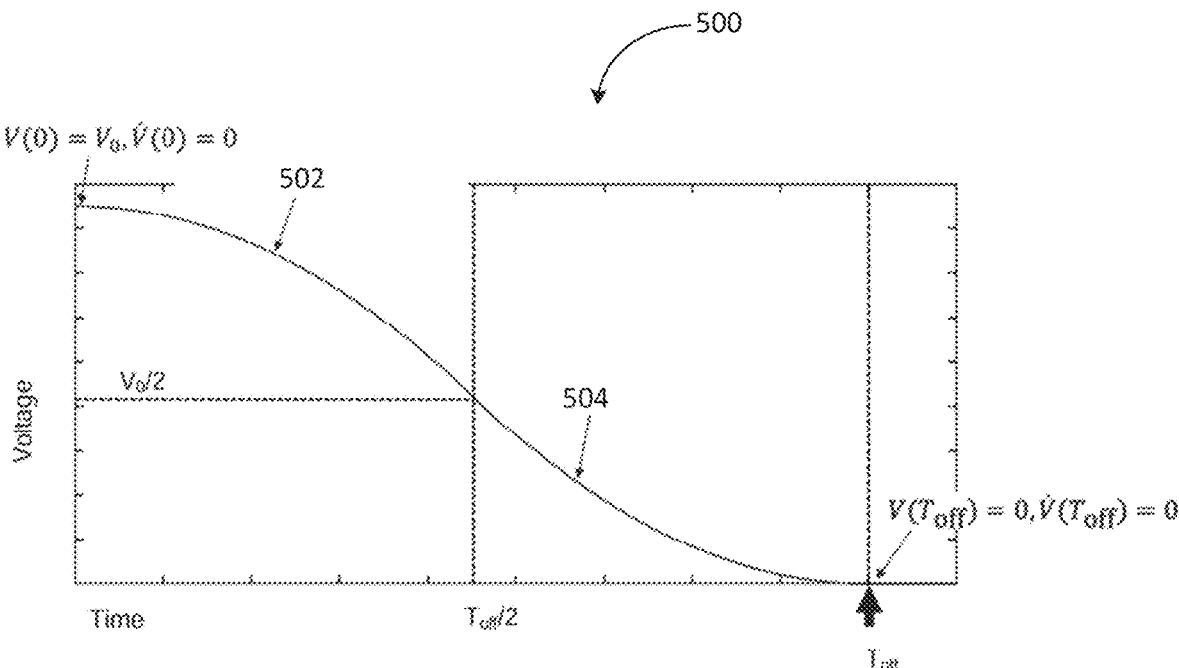
FIG. 5 is a conceptual graph illustrating an exemplary slew control voltage waveform generated by a slew control voltage generator, in accordance with aspects of this disclosure.

FIG. 5 is a conceptual graph illustrating an exemplary slew control voltage waveform 500 generated by slew control voltage generator 309, in accordance with aspects of this disclosure. In FIG. 5, the vertical axis represents voltage, and the horizontal axis represents time. In some examples, slew control voltage generator 309 is implemented as a digital signal processor (DSP) that applies a piecewise quadratic function to produce an S-shaped slew control voltage waveform 500. Waveform 500 is used to drive a fine actuator group as it transitions from an active to an inactive state, mitigating PZT suspension oscillations and ensuring a controlled discharge of stored energy.

In some examples, the piecewise quadratic function comprises multiple quadratic segments applied over subintervals of a particular duration. In FIG. 5, the duration extends from time t=0 to time t=$T_{off}$. A first quadratic function 502 generates waveform 500 during the first half of this duration ($0 \rightarrow T_{off}/2$), and a second quadratic function 504 generates waveform 500 during the second half ($T_{off}/2 \rightarrow T_{off}$) of the duration. In this example, the voltage at t=$T_{off}/2$ is approximately half of the initial peak voltage V(0) at t=0. Referring to FIG. 3, waveform 500 may represent the output signal from first fine actuator driver 340-*a* when first fine actuator group 366 is transitioned to an inactive state, or the output signal from second fine actuator driver 340-*b* when second fine actuator group 376 is transitioned to an inactive state. Slew control voltage waveform 500 gradually ramps the voltage from V(0) down to 0 volts, allowing for a smooth discharge of potential energy stored in the PZT elements of the fine actuators.

While FIG. 5 illustrates slew control voltage waveform 500 as comprising two quadratic segments 502, 504, this example is merely illustrative and not limiting. In some examples, slew control voltage waveform 500 may include additional quadratic segments for even finer control over voltage decay. Additionally, different piecewise quadratic profiles may be employed for different groups of fine actuators, or a common quadratic profile may be shared across multiple actuator groups. These and other variations of slew control voltage waveform 500 are contemplated and fall within the scope of this disclosure.

Figure 6:
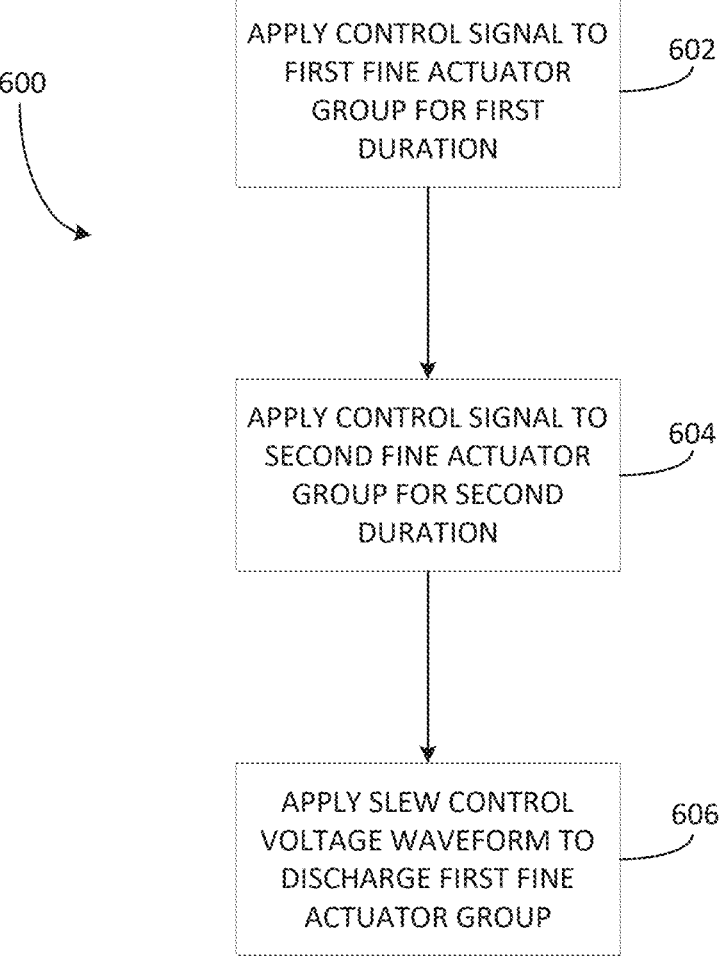
FIG. 6 is a flow diagram illustrating a method for controlling first and second fine actuator groups, in accordance with aspects of this disclosure.

FIG. 6 is a flow diagram illustrating a method 600 performed by control circuitry 22 for controlling first and second fine actuator groups, in accordance with aspects of this disclosure. In step 602, a control signal is applied to a first fine actuator group for a first duration. In some examples, the first fine actuator group is an inner group of fine actuators within actuator assembly 19 (e.g., inner fine actuators 26B, 26C). Referring to FIG. 3, step 602 may be executed by control circuitry 22 (e.g., SoC 301) controlling switch 306 to couple fine actuator control register 305 to first fine actuator driver 340-*a* via first DAC 308-*a* and first differential amplifier 333-*a*.

In step 604, the control signal is applied to a second fine actuator group for a second duration. In some examples, the second fine actuator group is an outer group of fine actuators within actuator assembly 19 (e.g., outer fine actuators 26A, 26D). Step 604 may be carried out by control circuitry 22 (e.g., SoC 301) controlling switch 306 to couple fine actuator control register 305 to second fine actuator driver 340-*b* via second DAC 308-*b* and second differential amplifier 333-*b*.

In step 606, performed concurrently with step 604 during the second duration, a slew control voltage waveform is applied to the first fine actuator group to gradually discharge the fine actuators as they transition to an inactive state. Step 606 may be executed by control circuitry 22 (e.g., SoC 301) controlling switch 316 to couple slew control voltage generator 309 to first fine actuator driver 340-*a* via first DAC 308-*a* and first differential amplifier 333-*a*. The slew control voltage waveform generated by slew control voltage generator 309 and applied to the first fine actuator group may take the form of the S-shaped quadratic waveform 500 illustrated in FIG. 5, ensuring a smooth voltage decay and minimizing PZT suspension oscillations.

Some head switch events, in which control circuitry 22 reassigns which fine actuator group is active, can introduce additional challenges when using a slew control voltage waveform to transition a fine actuator group from an active to an inactive state. In particular, PZT oscillations may occur if a head switch activates a previously inactive fine actuator group before the slew control voltage waveform has fully ramped down to zero—i.e., before the inactive fine actuators have been completely discharged. When control circuitry 22 enables an inactive fine actuator group, the starting voltage is typically initialized to zero. If the head switch occurs after the previously inactive fine actuators have fully completed their S-shaped slew control ramp to zero volts, then the transition back to an active state remains continuous and induces minimal or no PZT oscillation. However, if the switch to an active state occurs mid-ramp-before the slew control voltage waveform has fully decayed-a voltage discontinuity may be introduced into the fine actuator drive signal, potentially causing mechanical oscillations in the piezoelectric (PZT) elements of the fine actuators.

One approach to mitigating this issue is to shorten the duration (time constant) of the slew control voltage waveform, thereby reducing the likelihood that a head switch occurs mid-ramp and minimizing abrupt transitions in the drive signal when a fine actuator group switches from an inactive to an active state. However, reducing the ramp duration also diminishes the vibration damping effect during the active-to-inactive transition, potentially allowing residual oscillations to persist. Conversely, extending the S-shaped ramp enhances oscillation suppression during deactivation but increases the risk of a head switch occurring before the voltage fully ramps down to zero, leading to voltage discontinuities that may induce PZT oscillations. As track density (tracks per inch or TPI) continues to increase, this trade-off between ramp duration and the risk of mid-ramp switching becomes more pronounced, potentially affecting head position stability and overall drive performance.

Figures 7A, 7B:
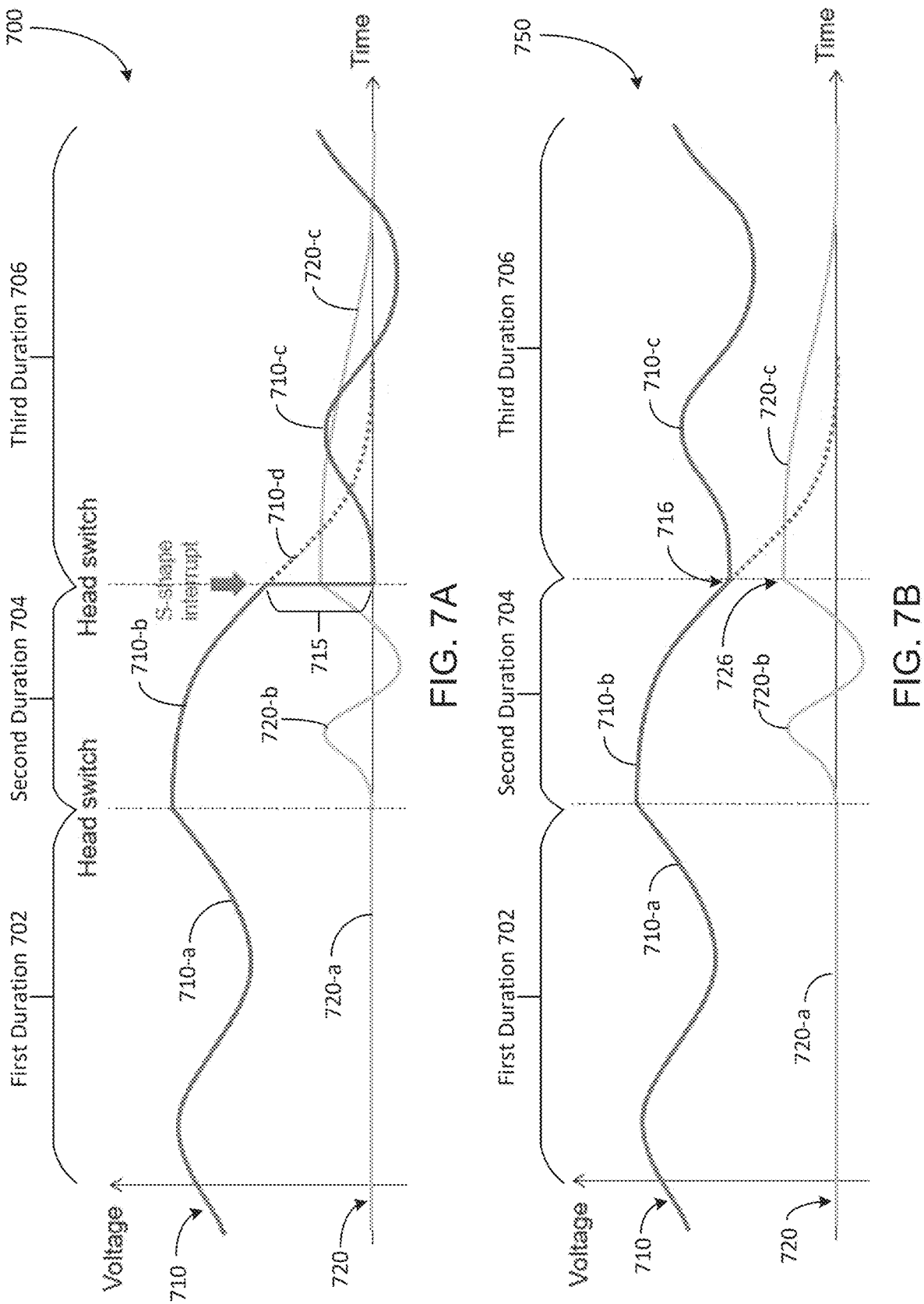
FIG. 7A is a timing diagram illustrating a voltage discontinuity that may occur when a fine actuator group transitions back to an active state mid-slew, in accordance with aspects of this disclosure.
FIG. 7B is a timing diagram illustrating mitigation of the sharp voltage discontinuities of FIG. 7A when a fine actuator group transitions to an active state mid-ramp, in accordance with aspects of this disclosure.

FIG. 7A is a timing diagram 700 illustrating a voltage discontinuity 715 that may occur when a fine actuator group transitions back to an active state mid-slew, according to aspects of this disclosure. Timing diagram 700 depicts first actuator group driver signal 710 and second actuator group driver signal 720 over a time period that includes first duration 702, second duration 704, and third duration 706. During first duration 702, SoC 301 controls switches 306 and 316 (FIG. 3) to drive first actuator group driver signal 710 to active voltage level 710-*a*, thereby activating first fine actuator group 366. Second fine actuator group 376 is inactive during first duration 702, as indicated by zero-level portion 720-*a* of second actuator group driver signal 720. At the transition from first duration 702 to second duration 704, SoC 301 controls switches 306 and 316 to perform a head switch: second actuator group driver signal 720 is transitioned from zero to active voltage level 720-*b*, thereby activating second fine actuator group 376, while first fine actuator group 366 is transitioned to an inactive state via S-shaped slew control voltage waveform 710-*b*.

At the transition from second duration 704 to third duration 706, with slew control voltage waveform 710-*b* still in progress, SoC 301 controls switches 306, 316 to perform another head switch: first fine actuator group 366 is returned to an active state by driving first actuator group driver signal 710 to an active voltage level 710-*c*, while second fine actuator group 376 is transitioned to an inactive state by driving it with slew control voltage waveform 720-*c*. Here, at the transition from second duration 704 to third duration 706, concerns about mid-ramp transitions back to an active state are highlighted. Because the switch of first actuator group driver signal 710 back to an active state occurs mid-ramp—that is, before slew control voltage waveform 710-*b* has finished decaying to zero (i.e., along dashed line 710-*d*)—a discontinuity 715 is introduced into driver signal 710 at the time of the head switch. Slew control voltage waveform 710-*b* gradually transitioning the first actuator group to zero is suddenly superseded by a new control signal originating from firmware in SoC 301. Because the new control signal typically begins at zero (or another default reference), the discontinuity 715 between the in-progress slew control voltage waveform 710-*b* and the newly active voltage level 710-*c* produces a sudden and steep drop in voltage, potentially exciting the PZT elements of the fine actuators and causing mechanical resonance or oscillatory behavior.

FIG. 7B is a timing diagram 750 illustrating a methodology for mitigating sharp voltage discontinuities when a fine actuator group transitions to an active state mid-ramp, according to aspects of this disclosure. Similar to FIG. 7A, timing diagram 750 depicts first actuator group driver signal 710 and second actuator group driver signal 720 over a time period that includes first duration 702, second duration 704, and third duration 706. During first duration 702, first actuator group driver signal 710 is driven at active voltage level 710-*a*, thereby activating first fine actuator group 366, while second actuator group driver signal 720 remains inactive. At the transition from first duration 702 to second duration 704, second actuator group driver signal 720 is driven to active voltage level 720-*b*, activating second fine actuator group 376, while first fine actuator group 366 is gradually transitioned to an inactive state via S-shaped slew control voltage waveform 710-*b*.

At the transition from second duration 704 to third duration 706, while slew control voltage waveform 710-*b* is still in progress, SoC 301 controls switches 306 and 316 to perform another head switch: first fine actuator group 366 is transitioned back to an active state by driving first actuator group driver signal 710 to active voltage level 710-*c*, while second fine actuator group 376 is transitioned to an inactive state via slew control voltage waveform 720-*c*. To prevent a voltage discontinuity at this transition, SoC 301 retrieves the last output value of slew control voltage waveform 710-*b* from PLSI 302, overrides the default zero-voltage starting point, and initializes the control output for first actuator group driver signal 710 (control signal 303) at the last voltage level of the slew control voltage waveform, rather than resetting it to zero. As can be seen in FIG. 3, this may be facilitated by coupling the output 310 of slew control voltage generator 309 to SoC 301. In some examples, a register or memory may also be provided to hold the last value of the real-time output of slew control voltage generator 309. By preventing abrupt voltage discontinuities such as discontinuity 715 of FIG. 7A, longer time constants can be employed to shape the quadratic slew control voltage waveform, which leads to superior attenuation of PZT oscillations during active-to-inactive transitions while simultaneously averting resonant spikes during mid-ramp switches.

Likewise, when transitioning a previously active fine actuator group to an inactive state by driving the previously active fine actuator group with a slew control voltage waveform, slew control voltage generator 309 retrieves the last output value of fine actuator control register 305 (the last control voltage provided by the firmware of SoC 301) and initializes the slew control voltage waveform at that voltage level. As can be seen in FIG. 3, this is facilitated by coupling the output 312 of fine actuator control register 305 to slew control voltage generator 309.

FIG. 8 illustrates a method 800 for mitigating voltage discontinuities when a fine actuator group transitions to an active state, according to aspects of this disclosure. In step 802, a slew control voltage waveform is applied to a fine actuator group (e.g., a first fine actuator group) to transition the fine actuator group from an active state to an inactive state. In some examples, as shown in FIG. 3, control circuitry 22 (e.g., SoC 301) controls switch 316 to couple slew control voltage generator 309 to the DAC corresponding to the fine actuator group (e.g., DAC 308-*a*), generating a gradually decreasing slew control voltage waveform that smoothly ramps down the actuator drive signal. This controlled transition prevents an abrupt voltage drop that could otherwise induce PZT oscillations. As illustrated in FIG. 5, the slew control voltage waveform gradually decreases from an active state V(0) to zero over a predefined ramp duration $T_{off}$.

In step 804, a control signal initiating at a last-applied value of the slew control voltage waveform is applied to the fine actuator group to transition the fine actuator group back to the active state before completion of the slew control voltage waveform (i.e., before the predefined ramp duration $T_{off}$ has elapsed). In some examples, as shown in FIG. 7B, at the moment 716 of transition, SoC 301 retrieves the last voltage value of the ongoing slew control voltage waveform from PLSI 302 and applies it as the initial value for the control signal. As can be seen in FIG. 3, this may be facilitated by coupling the output 310 of slew control voltage generator 309 to SoC 301. This ensures a seamless transition by preventing an abrupt reset to zero that could otherwise create a voltage discontinuity (such as voltage discontinuity 715 of FIG. 7A). SoC 301 controls switch 306 to couple fine actuator control register 305 to the appropriate DAC (e.g., DAC 308-*a*), reactivating the fine actuator group at a continuous voltage level 716 instead of performing a hard reset. This smooth transition is reflected in FIG. 7B, where slew control voltage waveform segment 710-*b* transitions continuously at 716 to active waveform segment 710-*c*.

In step 806, if a previously-active fine actuator group (e.g., a second fine actuator group) needs to be simultaneously transitioned to an inactive state, then the slew control waveform is applied to that previously-active fine actuator group, starting at its last applied voltage level to transition it to an inactive state. In some examples, as shown in FIG. 7B, at the moment 726 of transition, slew control voltage generator 309 retrieves the last voltage value of the ongoing SoC control signal from fine actuator control register 305 and applies it as the initial value for the slew control voltage waveform. As can be seen in FIG. 3, this may be facilitated by coupling the output 312 of fine actuator control register 305 to slew control voltage generator 309. SoC 301 then controls switch 316 to couple slew control voltage generator 309 to the second fine actuator group, initiating the slew control voltage waveform at the last-applied value of the second fine actuator group's active drive signal to ensure a controlled ramp-down.

The methods and flow diagrams disclosed herein are executed by control circuitry 22, which is responsible for performing fine actuator voltage slew control in accordance with aspects of this disclosure. Control circuitry 22 may be implemented partially or wholly in one or more processing devices, such as a programmable logic device (PLD), a field-programmable gate array (FPGA), an integrated circuit (IC) such as a system-on-a-chip (SoC), a power large scale integration (PLSI) circuit, an application-specific integrated circuit (ASIC), an ARM-based microcontroller, or any other suitable processing unit.

In some examples, control circuitry 22 may comprise a microprocessor executing instructions stored in a computer-readable medium, such as a non-volatile semiconductor memory device. These instructions may be stored in external memory accessible to the microprocessor or integrated within an SoC. Alternatively, the instructions may be stored on a disk and loaded into a volatile semiconductor memory when the HDD is powered on. Control circuitry 22 may also include state machine logic, digital signal processing (DSP) circuits (e.g., slew control voltage generator 309), and other suitable logic elements configured to implement the methods described herein using hardware, software, or a combination of both. The methods and flow diagrams disclosed herein may be implemented using digital processing techniques, analog processing techniques, or a hybrid approach combining both.

One or more processing devices may comprise control circuitry 22 and may be configured to perform, individually and/or collectively, some or all of the functions of control circuitry 22 as described herein. These processing devices may be physically integrated within the HDD or may be abstracted from direct physical proximity to the disk drive. In certain implementations, processing devices executing fine actuator voltage slew control methods may be located within or proximate to a unitary HDD product, a rack-mounted data storage system containing multiple HDDs, or a larger networked environment, such as a local area network (LAN), storage area network (SAN), data center infrastructure, or cloud-based storage service.

While certain embodiments are described herein, they are provided by way of example only and do not limit the scope of this disclosure. Various modifications, substitutions, and omissions may be made without departing from the spirit and scope of the invention. The methods and processes described herein are not limited to any particular sequence and may be used independently or in combination. Steps may be omitted, reordered, or added in different implementations. No aspect of this description should be interpreted as requiring any specific feature, component, or step as essential or indispensable. Many variations, modifications, and enhancements are possible, all of which fall within the scope of the invention as defined by the following claims.

The invention claimed is:

1. A data storage device comprising:
   a recording head;
   a disk;
   a first fine actuator group configured to position the recording head over the disk; and
   control circuitry configured to:
      apply a slew control voltage waveform to the first fine actuator group to transition the first fine actuator group from an active state to an inactive state; and
      apply a control signal, initiating at a last-applied value of the slew control voltage waveform, to the first fine actuator group to transition the first fine actuator group back to the active state before completion of the slew control voltage waveform.

2. The data storage device of claim 1, further comprising a second fine actuator group, wherein the control circuitry is further configured to:
   concurrently with applying the control signal to the first fine actuator group, apply the slew control voltage waveform to the second fine actuator group to transition the second fine actuator group from the active state to the inactive state; and
   initiate the slew control voltage waveform at a last voltage level of the second fine actuator group before the transition of the second fine actuator group to the inactive state.

3. The data storage device of claim 2, wherein the control circuitry comprises a slew control voltage generator configured to generate the slew control voltage waveform as a piecewise quadratic slew control voltage waveform having an S-shaped profile.

4. The data storage device of claim 3, wherein the control circuitry comprises:
   a system on a chip (SoC); and
   a power large scale integrated circuit (PLSI), wherein the PLSI comprises a fine actuator control register configured to receive the control signal from the SoC.

5. The data storage device of claim 3, wherein the slew control voltage generator comprises a digital signal processor.

6. The data storage device of claim 4, wherein:
   the SoC is coupled to an output of the slew control voltage generator to receive the last-applied value of the slew control voltage waveform; and
   the slew control voltage generator is coupled to the output of the fine actuator control register to receive the last voltage level of the second fine actuator group.

7. The data storage device of claim 6, further comprising:
   a first switch for selectively applying the control signal to one of the first fine actuator group and the second fine actuator group; and
   a second switch for selectively applying the slew control voltage waveform to another of the first fine actuator group and the second fine actuator group.

8. The data storage device of claim 7, wherein the PLSI further comprises:

a first differential amplifier and a first fine actuator driver selectively coupled to the first and second switches and configured to drive the first fine actuator group; and a second differential amplifier and a second fine actuator driver selectively coupled to the first and second switches and configured to drive the second fine actuator group.

9. The data storage device of claim 2, wherein the first fine actuator group comprises inner fine actuators configured to position an inner head group over a first set of disk surfaces; and the second fine actuator group comprises outer fine actuators configured to position an outer head group over a second set of disk surfaces.

10. A method for controlling a data storage device, comprising:

applying a slew control voltage waveform to a first fine actuator group to transition the first fine actuator group from an active state to an inactive state; and applying a control signal initiating at a last-applied value of the slew control voltage waveform to the first fine actuator group to transition the first fine actuator group back to the active state before completion of the slew control voltage waveform.

11. The method of claim 10, further comprising:

concurrently with applying the control signal to the first fine actuator group, applying the slew control voltage waveform to a second fine actuator group to transition the second fine actuator group from the active state to the inactive state; and initiating the slew control voltage waveform at a last voltage level of the second fine actuator group before the transition of the second fine actuator group to the inactive state.

12. The method of claim 11, further comprising generating the slew control voltage waveform by a slew control voltage generator as a piecewise quadratic slew control voltage waveform having an S-shaped profile.

13. The method of claim 12, further comprising:

generating the control signal by a system on a chip (SoC); and receiving the control signal by a fine actuator control register on a power large scale integrated circuit (PLSI).

14. The method of claim 10, further comprising generating the slew control voltage waveform by a digital signal processor (DSP).

15. The method of claim 13, further comprising:

coupling the SoC to an output of the slew control voltage generator to receive the last-applied value of the slew control voltage waveform; and coupling the slew control voltage generator to the output of the fine actuator control register to receive the last voltage level of the second fine actuator group.

16. The method of claim 15, further comprising:

selectively applying the control signal to one of the first fine actuator group and the second fine actuator group by a first switch; and selectively applying the slew control voltage waveform to another of the first fine actuator group and the second fine actuator group by a second switch.

17. The method of claim 16, further comprising:

selectively coupling the first and second switches to a first differential amplifier and a first fine actuator driver to drive the first fine actuator group; and selectively coupling the first and second switches to a second differential amplifier and a second fine actuator driver to drive the second fine actuator group.

18. The method of claim 11, wherein:

the first fine actuator group comprises inner fine actuators configured to position an inner head group over a first set of disk surfaces; and the second fine actuator group comprises outer fine actuators configured to position an outer head group over a second set of disk surfaces.

19. Control circuitry for controlling a data storage device, the control circuitry comprising:

means for applying a slew control voltage waveform to a first fine actuator group to transition the first fine actuator group from an active state to an inactive state; and means for applying a control signal initiating at a last-applied value of the slew control voltage waveform to the first fine actuator group to transition the first fine actuator group back to the active state before completion of the slew control voltage waveform.

20. The control circuitry of claim 19, further comprising:

means for applying, concurrently with applying the control signal to the first fine actuator group, the slew control voltage waveform to a second fine actuator group to transition the second fine actuator group from the active state to the inactive state; and means for initiating, concurrently with applying the control signal to the first fine actuator group, the slew control voltage waveform at a last voltage level of the second fine actuator group before the transition of the second fine actuator group to the inactive state.

* * * * *